July 12, 1966  C. F. TAMBASCO  3,260,439
ELECTRIC SOLDERING IRON TIP
Filed Aug. 27, 1964

INVENTOR
CHARLES F. TAMBASCO
BY
*William V. Pesce*
ATTORNEY.

United States Patent Office 3,260,439
Patented July 12, 1966

3,260,439
ELECTRIC SOLDERING IRON TIP
Charles F. Tambasco, Brooklyn, N.Y., assignor to Belock Instrument Corporation, College Point, Long Island, N.Y., a corporation of New York
Filed Aug. 27, 1964, Ser. No. 392,464
3 Claims. (Cl. 228—55)

This invention relates to soldering iron tips in general and is particularly directed to an electric iron soldering tip having a plurality of apertures simultaneously engaging a plurality of electrodes for the rapid and simultaneous removal and/or installation of electron discharge devices from and/or to their terminal sockets.

Electron devices and particularly transistor devices have their terminal leads connected to standard type sockets to which they are soldered. To make the connection, the transistor terminal leads are each passed through feed-through terminals emanating from the socket side opposite to which the transistor is mounted. Thereafter, the transistor terminal leads and feed-through terminals are soldered to permit the transistor to firmly remain in the socket. To remove the transistor, the solder at the feed-through terminals must be melted, one terminal at a time, until the bonds of each terminal are released. Applying heat to the individual terminals creates a heat imbalance to the transistor electrode and possible stresses thereto which cause rupture and/or damage to the electrodes resulting from such nonuniform heat.

Changing previously mounted transistors by singly removing the terminals connected thereto caused the said transistors to be broken when removed or replaced, a condition or situation which, especially in assembly-line operation, is costly, time-consuming and very inefficient.

To off-set these difficulties, limitations and others, a novel soldering iron tip has been invented which provides a plurality of heating members forming a part thereof in the nature of apertures or holes, each being disposed to engage a terminal point when the soldering tip is suitably oriented by special guiding means to thereby simultaneously melt the solder by the simultaneous application of heat at the various terminal points forming a part of the socket member.

It is therefore an object of the invention to provide an improved soldering iron tip.

Another object of the invention is to provide a soldering iron tip which can simultaneously solder or un-solder a plurality of terminals or areas on a socket member.

Another object of the invention is to provide soldering means that produces uniform heating distribution about the terminal points connecting electron devices and their supporting members.

A still further object of the invention is to provide soldering means that permits connecting and disconnecting electron devices from their supporting members which is rapid, simple, economical and efficient.

And a still further object of the invention is to provide soldering means that have suitable polarizing and guiding elements to permit the rapid orientation thereof relative to the connecting terminals between electron devices and their support members.

Further objects and advantages will become more apparent from a reading of the specifications herein and the accompanying drawings and wherein.

Figure 1:
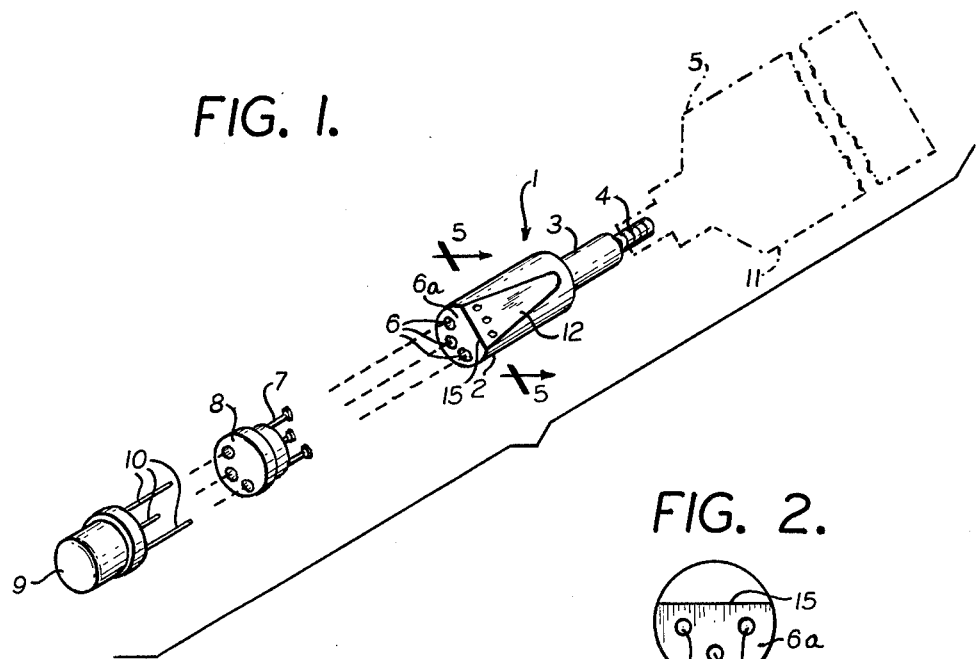
FIGURE 1 shows in perspective array the soldering iron tip according to the invention and a typical transistor and socket mounting therefor disassembled.
Figure 2:
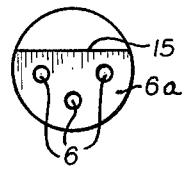
FIGURE 2 shows a front view of the soldering iron tip of FIGURE 1.
Figure 3:
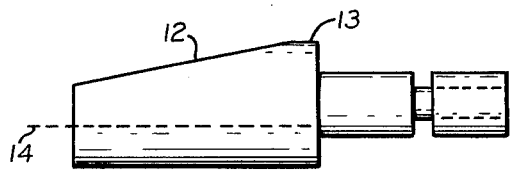
FIGURE 3 shows a side view of the soldering iron tip of FIGURE 1.

Now referring to the drawings and particularly to FIGURES 1–3, there is shown a soldering iron tip generally designated 1 comprising an elongated solid cylindrical member 2, a co-extensive, co-axially connected smaller diameter shaft 3 and a still smaller diameter co-extensive, coaxially connected screw 4, each arranged in telescopic fashion with the screw portion thereof disposed to fit into and be supported by an electric soldering iron 5, in the usual socket thereof, as shown in the said figure. The soldering iron tip 1 as shown may be of copper or any other suitable metallic substance which can readily conduct heat to permit the temperature elevation thereof suitably for the melting of solder.

The cylindrical shaft-like member 2 has at one extremity thereof, remote from the shaft 3, a series of three arcuate spaced axially oriented apertures or holes 6 extending inward from the extreme tip end 6a, a distance comparable to the feed-through terminals 7 extending outwardly from a transistor socket 8. A transistor 9 having terminal leads 10 is mounted to the socket 8, the terminals thereof arranged to fit into the socket and the feed-through terminals thereof.

The transistor terminals 10 of transistor 9 and feed-through terminals 7 of socket 8 are connected and adhered to each other via solder-type bond produced by the application of heat and solder to the terminal areas. In the instant case the heat to the respective terminal areas is applied via the holes 6. The feed-through terminals are completely surrounded and enclosed by the area defined by the respective holes. The heat to the soldering iron tip is supplied by the soldering iron 11, shown dotted, in the usual and ordinary fashion applicable to such type irons. It must be appreciated that heat is applied simultaneously to the respective terminal areas by the plurality of apertures in the soldering iron tip in an even and uniform manner.

The uniform distribution of heat, as previously described, prevents the rupture and breakage of the transistor elements which would otherwise be the case as results from stresses and strains of heat unevenly and nonuniformly applied.

Transistor devices have generally terminal leads emanating therefrom each representative of certain electrodes within the device and to which they are connected. The terminal leads therefore have an external configuration representative of the internal design and function of the transistor device. As in the instant case, there is shown a transistor device 9 having the usual collector, emitter and base electrodes to which the external terminal leads 10 are connected. The said external terminal leads 10 however are oriented and positioned so as to make them easily and quickly identifiable. The socket 8 is also constructed so as to have the feed-through terminals 7 thereof match the positioning of the transistor terminal leads and thus facilitate the accommodation thereof in circuitry design and fabrication. Similarly, to accommodate the design configuration of the feed-through terminals, the soldering iron tip had the holes or apertures 6 thereof oriented and positioned so as to conform to and accommodate the said feed-through terminals. However, to assure the rapid accommodation of the said feed-through terminals and holes, special polarizing means are further provided to the said soldering iron tip so as to permit is rapid engagement and accommodation with the feed-through terminals and the speedy melting of the solder at the said terminals.

One form of polarizing means is shown in FIGURES 1–3 in the type of configuration taken on by the cylindrical member 2. In particular there is shown, as a preferred embodiment, a cylinder 2 truncated by an obliquely slanted plane 12 starting at a point intermediate the extremities thereof along the surface 13 and extending from the said surface 13 towards its central longitudinal axis 14 and terminating in a plane transverse to the said longitudinal axis at the cylinder end 6a, the termination point of the apertures 6. The terminal end of the truncating plane has its edge 15 bridging a pair of holes diametrically displaced to indicate the location of the said holes and thus provide the direction of orientation to be assumed by the soldering iron tip when negotiating the feed-through terminals previously referred to. Although truncated cylinder arrangement is one method of achieving polarization, other methods may also be used which would permit the proper guidance of the iron tip to the feed-through terminals. It all depends on the number of feed-through terminals and their orientation. This dictates the polarization required and desired.

To facilitate the engagement of the iron tip holes with the proper feed-through terminals, the said holes are preferably countersunk or expanded at the entrance or mouth portions to permit free and easy access of the said terminals into the holes of the soldering iron tip.

Figure 5:
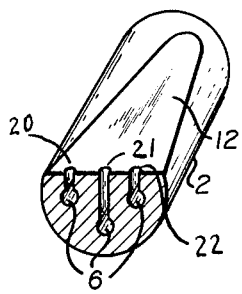
FIGURE 5 shows a soldering iron tip according to another embodiment of the invention and taken along the line 5—5 of FIGURE 1.

In the process of melting the terminal solder, to make or break the transistor connections, it has been assumed that the solder was already available at the particular terminal point. However, when new solder is to be applied, one method of supplying such solder would be through and into the holes themselves. Another convenient way would be to provide small feed-through radial passages which extend from the surface of the cylinder portion of the soldering iron tip directly to the hole so as to permit direct communication between the said hole and passageway. This is shown in FIGURE 5. In this particular embodiment the passageways 20, 21 and 22 each extend vertically from the truncating plane surface to the respective holes 6, the said passageway terminating at the hole intermediate its blocked or extreme end within the soldering iron tip. This manner of applying solder to the soldering iron tip holes is only for purposes of illustration, it being understood that any other convenient device or method would be sufficient to carry out the invention disclosed herein, e.g., the continuous feeding of solder to the terminal areas to be bonded or connected.

Figure 4:
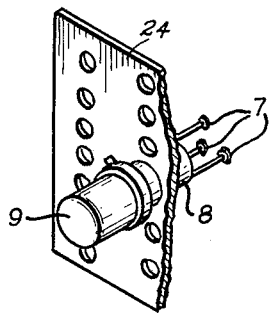
FIGURE 4 shows in perspective a transistor unit mounted in a transistor socket, the complete assembly secured to a plate forming a part of certain apparatus.

In a practical application of the invention the soldering gun tip is conveniently applied to feed-through terminals of a transistor socket which is already mounted to some apparatus, not defined, as shown in FIGURE 4. In the particular figure the socket 8 is mounted to a structural mounting board 24 of the apparatus and its feed-through terminals 7 exposed on one side of the board, the transistor being mounted to the socket on the opposite side of the board. The polarized iron tip can be conveniently applied to the feed-through terminals in a minimum amount of time to solder or un-solder said terminals for the insertion or removal of the transistor 9.

While it has been chosen to illustrate and describe certain preferred embodiments of the invention, it will be understood that these are by way of illustration only and are not to be considering as limiting. For example, the number of soldering iron tip apertures may be increased to accommodate devices having more than three electrodes and polarizing means can be designed to conform to the change in number of electrodes. Further, although holes or apertures are shown, it is possible to provide other heating members which can accommodate the terminal areas that have to be soldered, all simultaneously.

Having described the invention what is claimed is:

1. In an electrically heated soldering iron for soldering socket terminal areas having a predetermined configuration, a soldering iron tip comprising:
    (a) an elongated metal body member having an extremity thereof connected to the said soldering iron and heated thereby,
    (b) aperture means at the other extremity of the said body member for engaging simultaneously the socket terminal areas to permit the simultaneous soldering and unsoldering of the said areas, and
    (c) polarizing means on said body member for conveniently and rapidly orienting the said member with respect to the socket terminal area configuration, and
    (d) solder receptable means adjacent and in continuous communication with said aperture means for receiving and dispensing solder at the terminal areas.

2. In an electrically heated soldering iron according to claim 1 and wherein said aperture means includes a plurality of holes extending longitudinally within said body member and positionally oriented in accordance with said socket terminal areas.

3. In an electrically heated soldering iron according to claim 1 and wherein said solder receptacle means includes a plurality of passageways extending within said body member and communicating with said aperture means.

References Cited by the Examiner
UNITED STATES PATENTS

| | | | |
|---|---|---|---|
| 466,520 | 1/1892 | Cook | 228—52 |
| 3,050,612 | 8/1962 | Eversole | 228—19 |
| 3,084,649 | 4/1963 | Parstorfer | 228—19 |
| 3,130,286 | 4/1964 | Lenzi | 228 |

M. L. FAIGUS, *Assistant Examiner.*

WHITMORE A. WILTZ, *Primary Examiner.*